United States Patent
Havinis et al.

(10) Patent No.: US 6,360,102 B1
(45) Date of Patent: Mar. 19, 2002

(54) SYSTEM AND METHOD FOR DEFINING A SUBSCRIBER LOCATION PRIVACY PROFILE

(75) Inventors: Theodore Havinis, Plano; David Boltz, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/151,050

(22) Filed: Sep. 10, 1998

(51) Int. Cl.[7] .................................................. H04Q 7/06
(52) U.S. Cl. ........................ 455/457; 455/433; 455/411
(58) Field of Search .................................. 455/433, 456, 455/457, 440, 404, 435, 411; 72/715; 701/208

(56) References Cited

U.S. PATENT DOCUMENTS

| | | | | |
|---|---|---|---|---|
| 5,033,076 A | * | 7/1991 | Jones et al. ................. | 379/88.2 |
| 5,570,412 A | * | 10/1996 | LeBlanc et al. ............. | 455/456 |
| 5,602,903 A | * | 2/1997 | LeBlanc et al. ............. | 455/456 |
| 5,614,914 A | * | 3/1997 | Bolgiano ..................... | 342/364 |
| 5,742,668 A | * | 4/1998 | Pepe ........................... | 379/58 |
| 5,815,808 A | * | 9/1998 | Valentine ..................... | 455/422 |
| 5,901,352 A | * | 5/1999 | St-Pierre et al. ............. | 455/426 |
| 5,918,159 A | * | 6/1999 | Fomukong .................. | 455/38.1 |
| 6,038,451 A | * | 3/2000 | Syed ........................... | 455/445 |
| 6,044,265 A | * | 3/2000 | Roach, Jr. .................... | 455/419 |
| 6,049,718 A | * | 4/2000 | Stewart ........................ | 455/456 |
| 6,101,387 A | * | 8/2000 | Granberg et al. ............ | 455/433 |
| 6,131,067 A | * | 10/2000 | Girerd .......................... | 701/213 |
| 6,169,899 B1 | * | 1/2001 | Havinis et al. .............. | 455/433 |
| 6,181,937 B1 | * | 1/2001 | Joensuu ....................... | 455/433 |

* cited by examiner

*Primary Examiner*—Thanh Cong Le
*Assistant Examiner*—Nick Corsaro
(74) *Attorney, Agent, or Firm*—Jenkens & Gilchrist, P.C.

(57) ABSTRACT

A telecommunications system and method is disclosed for allowing each mobile subscriber that has subscribed to location services to define a Subscriber Location Privacy Profile (SLPP) containing a list of preferred subscribers that have permission to position the mobile subscriber. The SLPP can also define the conditions under which each of the preferred subscribers can position the mobile subscriber. The SLPP is preferably connected to the mobile subscriber's main subscription record in the Home Location Register and can be downloaded to the Mobile Switching Center/Visitor Location Register together the rest of the subscription information when the mobile subscriber is roaming.

26 Claims, 7 Drawing Sheets

SYSTEM AND METHOD FOR DEFINING A SUBSCRIBER LOCATION PRIVACY PROFILE

BACKGROUND OF THE PRESENT INVENTION

1. Field of the Invention

The present invention relates generally to telecommunications systems and methods for determining the location of a mobile terminal within a cellular network, and specifically for allowing mobile subscribers to define a privacy profile for positioning.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
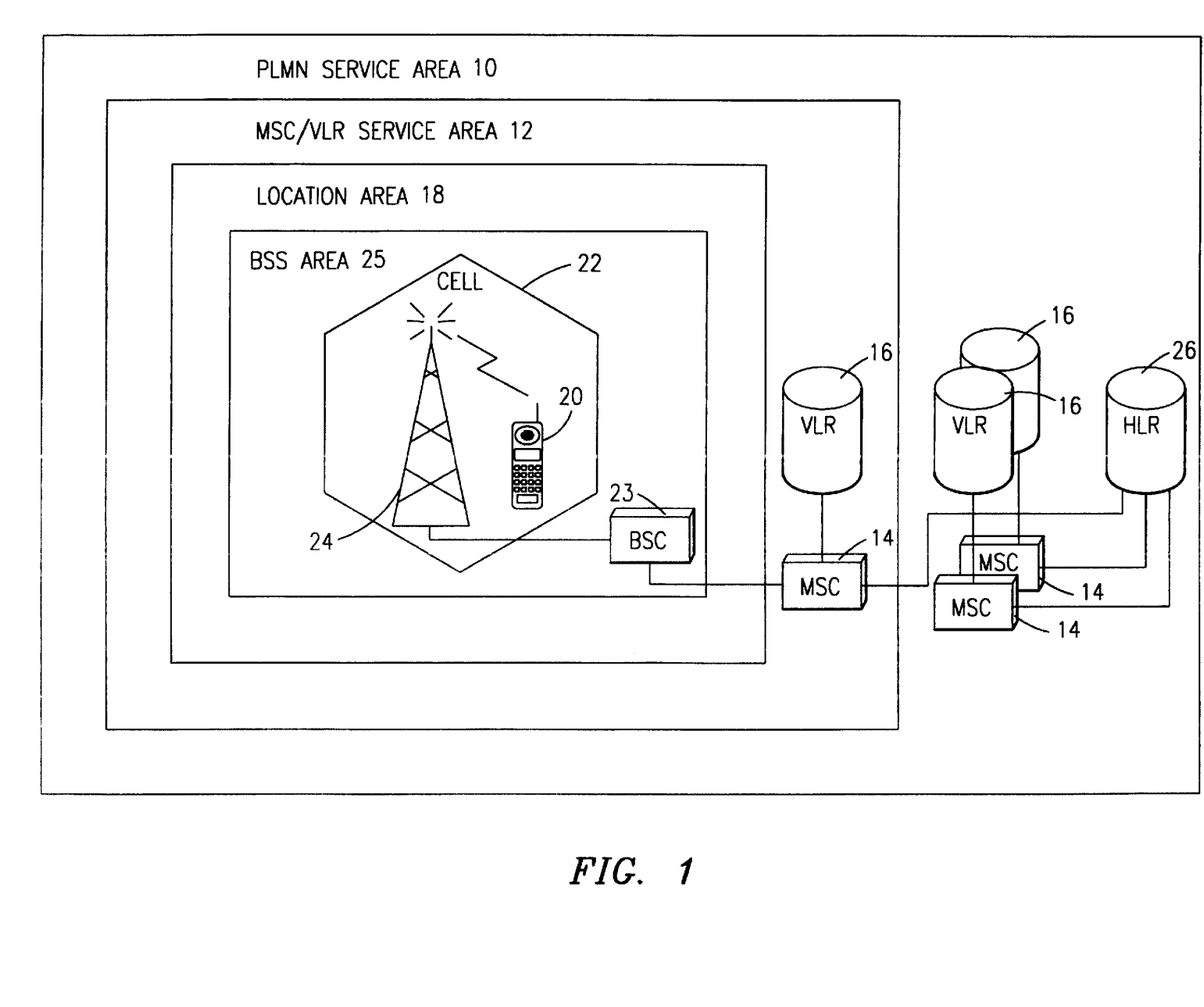
FIG. 1 is a block diagram of a conventional wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 requests data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of an MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital, e.g., Where am I service.

Figure 2:
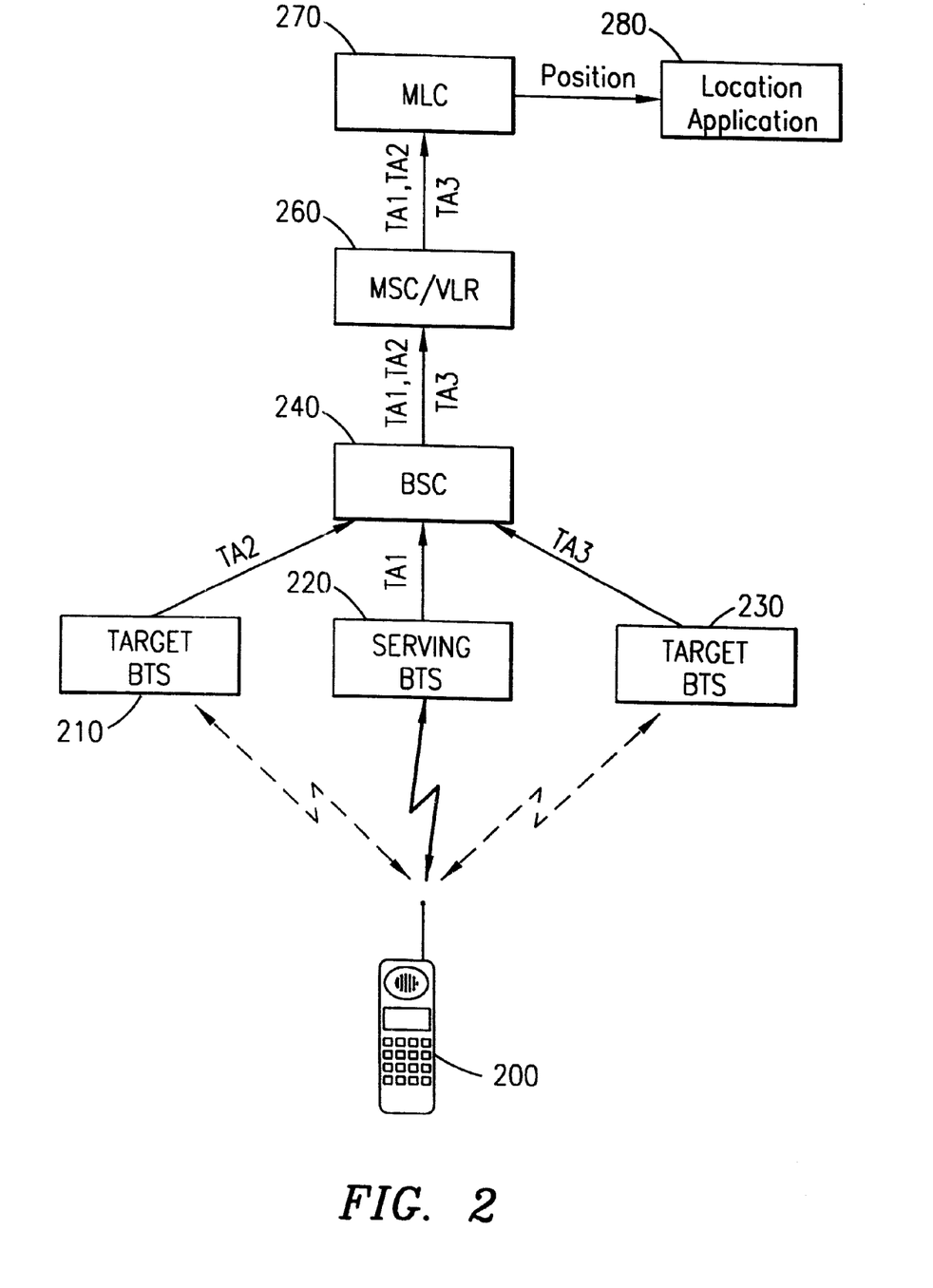
FIG. 2 illustrates a sample positioning of a mobile terminal in which positioning data is acquired by a mobile location center to determine the location of the mobile terminal within a cellular network.

As can be seen in FIG. 2 of the drawings, upon a network positioning request, the Base Station System (BSS) (220 and 240) serving the MS 200 to be positioned generates positioning data, which is delivered to the MSC 260. This positioning data is then forwarded to a Mobile Location Center (MLC) 270 for calculation of the geographical location of the MS 200. The location of the MS 200 can then be sent to a Location Application (LA) 280 that requested the positioning. Alternatively, the requesting LA 280 could be located within the MS 200 itself, within the MSC/VLR 260 or could be an external node, such as an Intelligent Network (IN) node.

In order to accurately determine the location of the MS 200, positioning data from three or more separate BTS's (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends upon the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the MS 200 can be determined (with certain accuracy) by the MLC 270.

It should be understood, however, that any estimate of time, distance, or angle for any cellular system 205 can be used, instead of the TA value discussed herein. For example, the MS 200 can have a Global Positioning System (GPS) receiver built into it, which is used to determine the location of the MS 200. In addition, the MS 200 can collect positioning data based on the Observed Time Difference (OTD) between the time a BTS 220 sends out a signal and the time the MS 200 receives the signal. This time difference information can be sent to the MLC 270 for calculation of the location of the MS 200. Alternatively, the MS 200, with knowledge of the location of the BTS 220, can determine its location.

Existing technology can provide subscribers with the ability to prevent LAs 280 from positioning them in order to protect their privacy. However, in some cases, it is necessary for the specific LA 280 to position the MS 200 regardless of the privacy settings of the particular subscriber. For example, when the LA 280 is an emergency center or a law enforcement agency, the community interest in positioning the MS 200 outweighs the subscriber's need for privacy. In this case, the privacy settings of the subscriber will need to be overridden in order for the emergency center or law enforcement agency to position the MS 200. In addition, LAs 280 may need to have the ability to override other location settings established by the subscriber. Thus, a Privacy Override Key (POK) (not shown) can be provided by network operators to allow an LA 280 to override the subscriber's privacy settings in order to obtain the location of the subscriber with a high degree of accuracy.

The POK is typically assigned on an individual LA 280 basis by a Gateway Mobile Location Center (GMLC) (not shown) during the registration of the LA 280 at the GMLC of the PLMN 205 that the LA 280 is located in. Normally, commercial-type LA's 280 are not allowed to override the subscriber's privacy settings, e.g., the assigned value of the POK is "not override". However, certain specific LA's 280, such as law enforcement or E-911, which must be capable of positioning a subscriber regardless of the subscriber's settings, can be assigned a POK with the value "allowed to override subscriber's privacy settings." It should be noted that when the subscriber is roaming, law enforcement LA's 280 will need, in addition to the POK with the value "allowed to override subscriber's privacy settings," a court order in order to be able to override the MS 200 privacy settings.

Even though a mobile subscriber has established privacy settings, the mobile subscriber may want to allow certain other subscribers or LAs 280 to have the ability to position the mobile subscriber regardless of the mobile subscriber's privacy settings. Such other subscribers could be, for example, the mobile subscriber's family or member(s) of a particular group, such as, e.g., in the case where the subscriber is an employee of a taxi company, the operations center or the mobile subscriber's manager. For those cases, the mobile subscriber may also want to put limits on the ability of those other subscribers or LA's 280 to position him. For example, the mobile subscriber may only want those LA's 280 to be able to position the mobile subscriber during certain hours or minutes of the day, certain days of the week or certain days, weeks or months of the year. In addition, the mobile subscriber may want to limit the number of allowable repetitive positionings by a particular subscriber or LA 280 per hour, day, week, or year.

It is, therefore, an object of the present invention to allow a mobile subscriber to define a location privacy profile, which contains a list of subscribers able to position the subscriber regardless of the mobile subscriber's privacy settings.

It is a further object of the present invention to permit a mobile subscriber to place limits on the ability of the subscribers within the location privacy profile to position the mobile subscriber.

It is still a further object of the present invention to download the mobile subscribers location privacy profile to the an MSC/VLR when the mobile subscriber is roaming within the area served by that MSC/VLR.

SUMMARY OF THE INVENTION

The present invention is directed to telecommunications systems and methods for allowing each mobile subscriber that has subscribed to location services to define a Subscriber Location Privacy Profile (SLPP), which contains a list of preferred subscribers or LA's that have permission to position the mobile subscriber. The SLPP can also define the conditions under which each of the preferred subscribers can position the mobile subscriber. For example, the mobile subscriber can limit the positioning by a particular preferred subscriber or LA to only certain hours of the day, certain days of the week and/or certain weeks of the year, and can limit the number of times that particular preferred subscriber or LA can request positioning of the mobile subscriber during those allowed times. The SLPP can preferably be connected to the mobile subscriber's main subscription record in the HLR and can be downloaded to the MSC/VLR together the rest of the subscription information when the MS is roaming within the area served by that MSC/VLR. In addition, in preferred embodiments, the mobile subscriber can define, activate, deactivate and delete the SLPP from the MS with a new family of MAP operations, which is similar in handling to Call Independent Supplementary Services (CISS) used within GSM systems.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Location Applications (LAs) currently have the ability to override a mobile subscriber's privacy settings by establishing a Privacy Override Key (POK) when the LA first registers with a Gateway Mobile Location Center (GMLC) serving the area that the LA is located in. Similarly, in some situations, mobile subscribers themselves would like to be able to override their privacy settings to allow specific subscribers or LA's to position them. For example, the mobile subscriber's family, boss or member(s) of a group of mobile subscribers may need to position the mobile subscriber regardless of the mobile subscribers privacy settings. This may be especially useful in the case where the mobile subscriber is an employee of a taxi company and the operations center or manager needs to obtain information regarding the mobile subscribers location.

Figure 3:
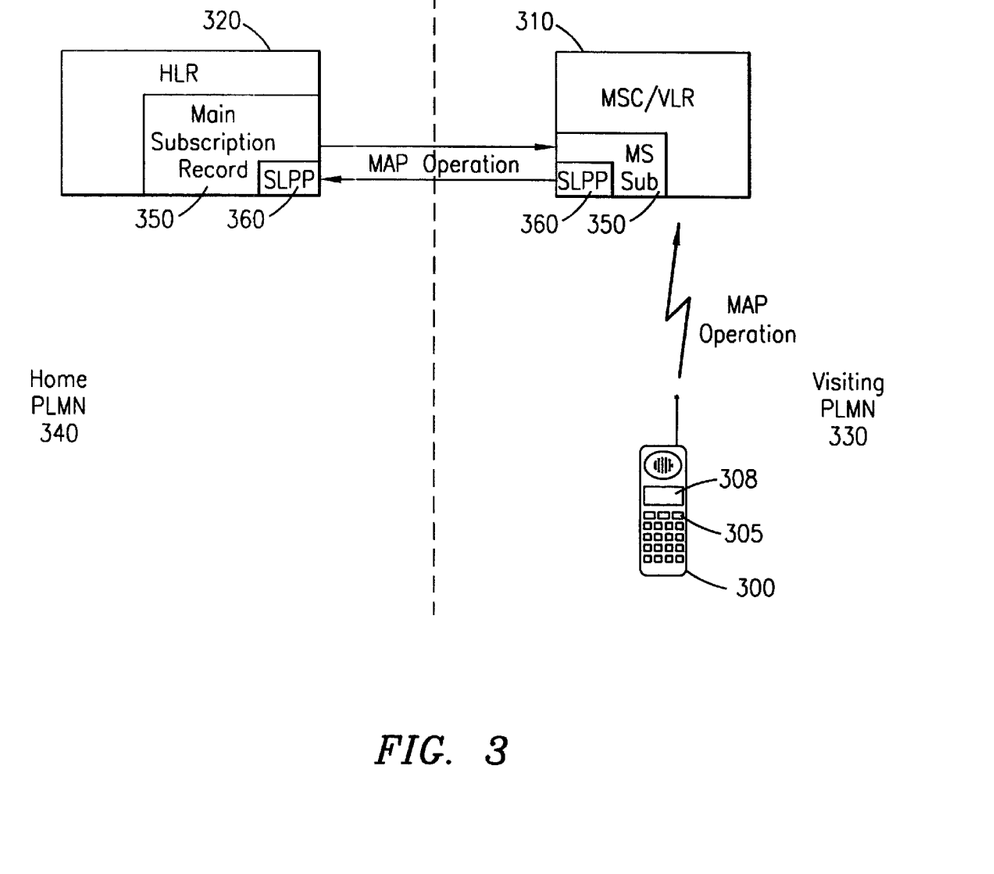
FIG. 3 is a block diagram showing the storage of a Subscriber Location Privacy Profile (SLPP) for a particular mobile subscriber within the mobile subscriber's Home Location Register in accordance with preferred embodiments of the present invention.

With reference now to FIG. 3 of the drawings, mobile subscriber's that have subscribed to location services can be assigned a Subscriber Location Privacy Profile (SLPP) 360, which defines a preferred list of additional subscribers or LA's to which the mobile subscriber gives permission to position the mobile subscriber. The SLPP 360 can preferably be connected to the main subscription record 350 in the mobile subscriber's Home Location Register (HLR) 320 in the mobile subscriber's home PLMN 340 such that the SLPP 360 can be downloaded to a Mobile Switching Center/Visitor Location Register (MSC/VLR) 310 when the Mobile Station (MS) 300 of the mobile subscriber roams into the PLMN 330 associated with the serving MSC/VLR 310.

Figure 4:
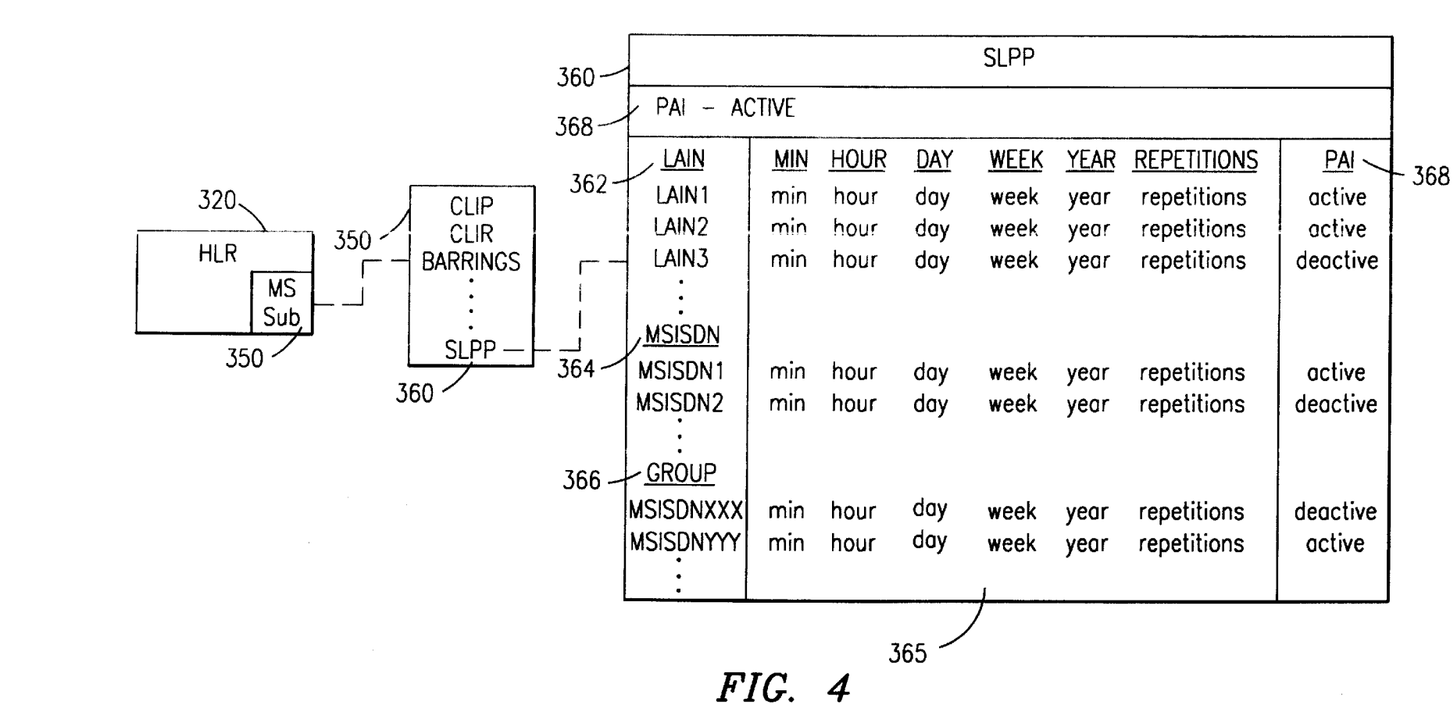
FIG. 4 is a sample structure of an SLPP for a mobile subscriber within the HLR showing various subscribers and Location Applications and the conditions under which each can position the mobile subscriber.

FIG. 4 illustrates a sample structure of an SLPP 360 of a particular mobile subscriber in the mobile subscriber's HLR 320 which contains a list of Location Application Identifier Numbers (LAINs) 362 for particular LA's and subscribers 364, e.g., Mobile Station Integrated Service Digital Network Numbers (MSISDNs), and the defined conditions 365 under which the requesting LAINs 362 and MSISDN's 364 are allowed to position the mobile subscriber, such as all day, certain hours or minutes of the day, certain days of the week or certain days, weeks or months of the year. In addition, the SLPP 360 can contain group information 366, such as an MSISDN number along with several additional digits, e.g., xxx or yyy, which are used for identifying the individual group members. It should be understood that the mobile subscriber can define the SLPP 360 so that certain LAINs 362, MSISDNs 364 or groups 366 are given permission by the mobile subscriber to always position the mobile subscriber or always position the mobile subscriber during specific times, which can be practical for the situation where an employee of a taxi company is given an MS 300 and the SLPP 360 is defined to always allow the operations center to position the employee's MS 300 during working hours. In addition, the SLPP 360 can define the number of repetitive positionings allowed by a particular LAIN 362, MSISDN 364 or group 366 per hour, day, week or year.

In preferred embodiments of the present invention, the mobile subscriber can define, activate, deactivate and/or delete the SLPP 360 or entries 362, 364 or 366 within the SLPP 360 from the MS 300 by using a new family of Mobile Application Part (MAP) protocol operations similar to the format of Call Independent Supplementary Services (CISS) of GSM systems. The mobile subscriber can enter various SLPP 360 features and instructions on the MS 300 by using function keys 305 and menu display 308 on the MS 300. These features and instructions can then be sent to the HLR 320 via the serving MSC/VLR 310 in a message in the format of the new MAP operations.

In addition, a Positioning Allowed Indicator (PAI) switch 368 can be provided within the SLPP 360 in the HLR 320 to allow the mobile subscriber to easily activate or deactivate the SLPP 360 or entries 362, 364 or 366 within the SLPP 360. For example, after the mobile subscriber has defined the SLPP 360 for a specific LAIN 362, MSISDN 364 or group 366, the mobile subscriber can activate or deactivate the SLPP 360 for that LAIN 362, MSISDN 364 or group 366 by sending a message to the HLR 320 to turn the PAI 368 for that LAIN 362, MSISDN 364 or group 366 on or off. Therefore, the mobile subscriber can prevent that particular LAIN 362, MSISDN 364 or group 366 from performing a positioning of the MS 300 of the mobile subscriber without deleting the LAIN 362, MSISDN 364 or group 366 from the SLPP 360. Thereafter, when the mobile subscriber decides that the LAIN 362, MSISDN 364 or group 366 can again position him, the mobile subscriber need only activate the PAI 368 for that LAIN 362, MSISDN 364 or group 366 instead of having to re-define the SLPP 360.

Figure 5:
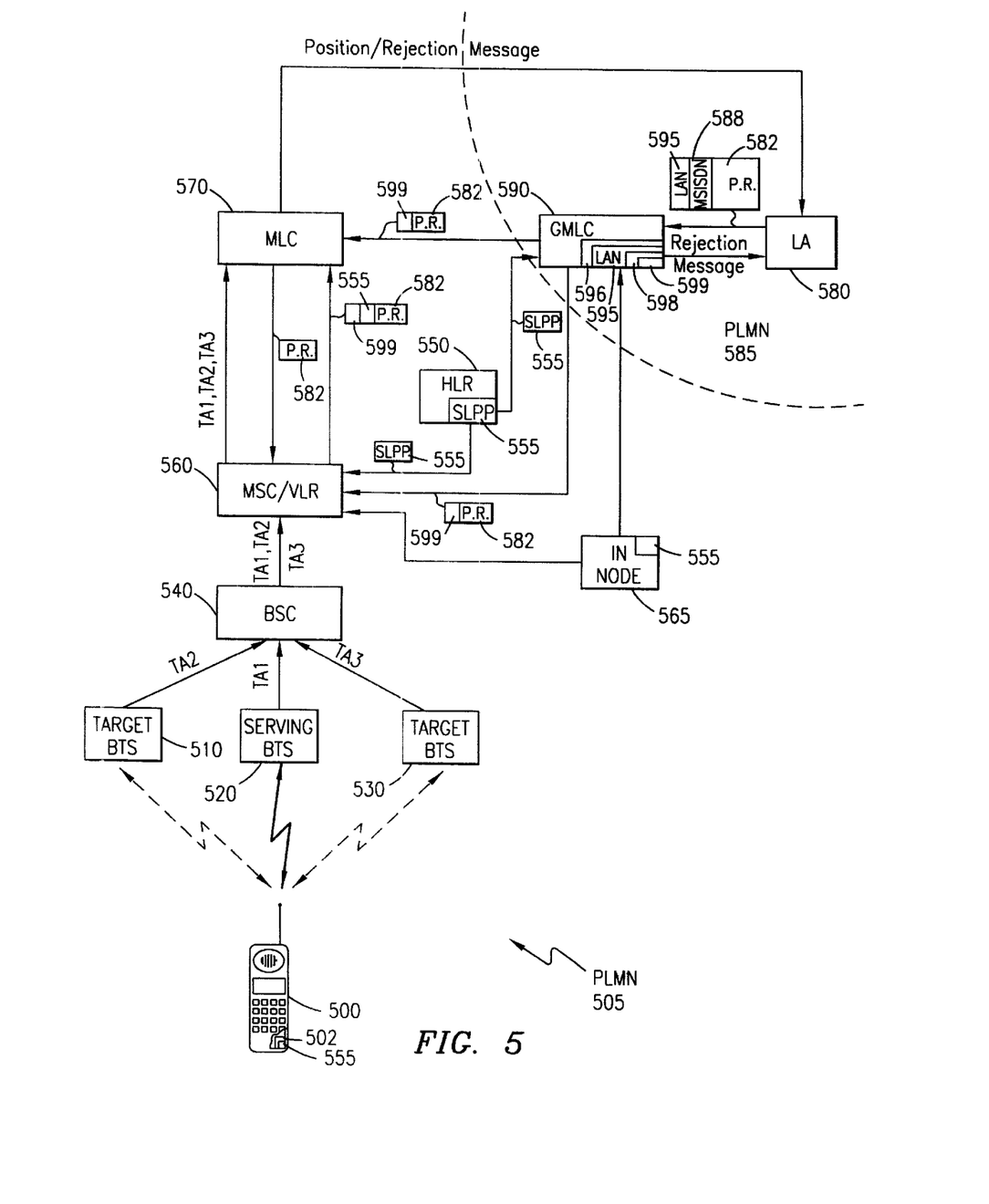
FIG. 5 is a block diagram depicting the positioning of a mobile terminal within a cellular network depending upon the values of a Positioning Override Keys associated with a requesting Location Application and the entries within the SLPP of the mobile terminal in accordance with preferred embodiments of the present invention.
Figure 6A:
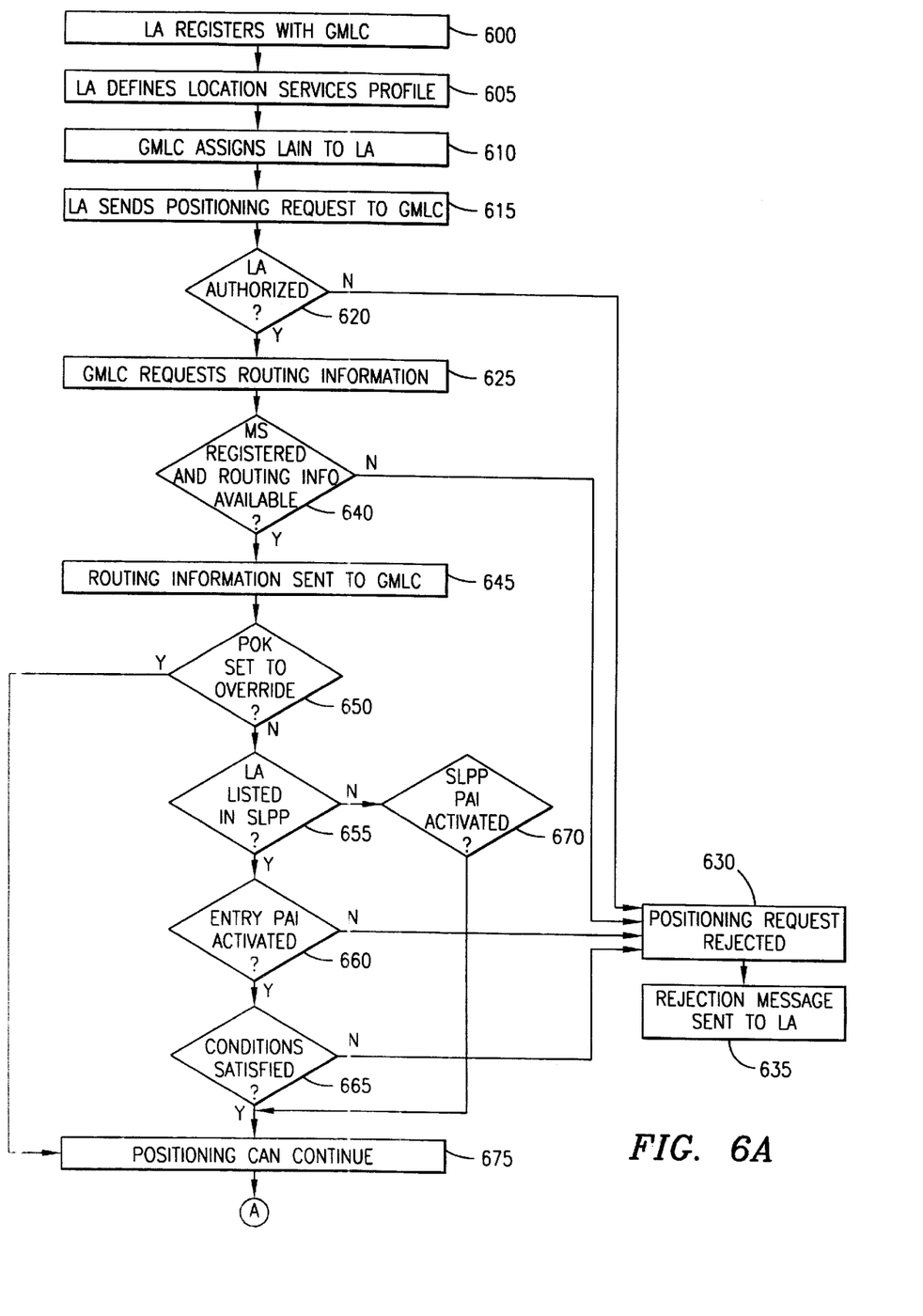
FIGS. 6A and 6B demonstrate steps in a sample positioning of a mobile terminal in accordance with preferred embodiments of the present invention.

With reference now to FIG. 5 of the drawings, which will be described in connection with the steps listed in FIGS. 6A and 6B of the drawings, prior to an LA 580 sending a positioning request 582 to the GMLC 390 (step 615), the LA 580 must first register with the GMLC 590 (step 600) and define within, for example, a database 596 within the GMLC 590, its location services profile 598 (step 605), e.g., all of the relevant service parameters specific to that LA 580. One such service parameter 598 that the LA 580 can define is whether the LA 580 has the authority to override subscriber limitations and/or system default behavior when positioning. Such service parameters 598 are called Location Override Keys (LOKs) (not shown). One such LOK is a Privacy Override Key (POK) 599. The POK 599 can either have the value "override" or "not override". In addition, each LA 580 shall be associated with a particular value of POK 599, with the default setting being "not override". At registration, a POK 599 can be accompanied by one or more additional parameters (not shown) that carry additional information related to the POK 599. This information can be used to further define the override capabilities. For example, a positioning method parameter can be included which defines the particular positioning method to be used when positioning.

Once the LA 580 has defined the service parameters 598 specific to that LA 580 (step 605), the GMLC 590 assigns an LAIN 595 (step 610), which identifies the particular LA 580 and the associated service parameters 598. Thereafter, the requesting LA 580 can send its LAIN 595 in a positioning request 582, specifying the particular MSISDN 588 associated with the particular MS 500 to be positioned (step 615) to the GMLC 590. However, if the LA 580 is an emergency center, the emergency center can define its location services 598 such that positioning can be performed on any MS 500 that dials "911", regardless of the MSISDN 588 or whether the particular MS 500 has an MSISDN 588 (in the case where service for the MS 500 has not yet been activated). In that case, when an MS 500 dials "911", the MSC/VLR 560 serving an area 505 that the MS 500 is located in triggers the positioning request in a serving Mobile Location Center (MLC) 570, and positioning of the MS 500 is performed. Thus, the emergency call can be routed to the appropriate Public Safety Answering Point (PSAP) (not shown) and emergency services can be dispatched to the current location of the MS 500.

When the GMLC 590 receives the positioning request 582 (step 615), the GMLC 590 analyzes the LAIN 595 to determine if the LA 580 is authorized to request positioning (step 620), e.g., that the LAIN 590 is registered in the GMLC 590. If the LA 580 is authorized to position the requested MS(s) 500 (step 620), the GMLC 590 can send a request for routing information (step 625), e.g., the address of the MSC/VLR 560 serving the PLMN 505 that the MS 500 is currently located in and positioning subscription information (SLPP) 555 for the MS 500, to the MS's HLR 550, using the MS's 500 directory number as a global title. The signaling network, e.g., the Signaling System #7 (SS7) network (not shown), can perform a global title translation on the MSISDN 588 and route the request to the appropriate HLR 550 for the MS 500. It should be noted that if, however, the LA 580 is not authorized to request positioning of the MS 500 (step 620), the positioning request 582 is rejected by the GMLC 590 (step 630) and a rejection message is sent to the LA 580 (step 635).

The HLR 550 then checks its records to confirm that the MS 500 is registered in the HLR 550, and that routing information for that MS 500 is available (step 640). If the MS 500 is not registered in the HLR 550 or the routing information is not available (step 640), the routing information request is rejected by the HLR 550 (step 630) and the GMLC 590 sends a rejection message to the LA 580 (step 635). However, if the MS 500 is registered in the HLR 550 and routing information is available (step 640), the routing information, e.g., the serving MSC/VLR 560 address, together with the positioning subscription information 555, is sent to the GMLC 590 (step 645).

The GMLC 590 then checks the service parameters 598 defined by the LA 580 (step 650). For example, if one of the LOKs is a POK 599, which, as stated above, can be used by the GMLC 590 to determine whether the privacy settings of the subscriber to be positioned should be overridden for the positioning request 582, the GMLC 590 then determines the value of the POK 599: "override" or "not override". If the value is set to "override" (step 650), the GMLC 590 does not check the privacy settings (SLPP) 555 of the MS 500 (step 655), and the positioning request 582 along with the POK 599 of "override" is forwarded to the MSC/VLR 560 (step 680). For example, if the LA 580 is an emergency center or a law enforcement agency, the LA 580 can define its location services profile 598 (step 605) such that positioning can be performed regardless of the privacy settings 555 of the subscriber being positioned. The particular LA's 580 allowed to override privacy settings 555 and the conditions for doing so can be established by the network is operator or local and/or national government regulations.

If, however, the POK 599 is set to "not override" (step 650), the GMLC 590 must then verify that the MS 500 to be positioned by the LA 580 allows positioning to be performed (step 655), e.g., by checking the positioning subscription information (SLPP) 555, sent by the HLR 550. The GMLC 590 checks whether the LA 580 or MSISDN requesting location information is listed within the SLPP 555 (step 655). If the LA 580 is listed in the SLPP 555 (step 655), and the conditions for that LA 580 are activated, e.g., the PAI for that LA entry is activated (step 660), then the conditions can be checked against the clock of the MSC/VLR 560 (step 665). If the conditions are satisfied (step 665), e.g., the MSC/VLR 560 clock matches the allowable time defined for the particular LA 580 and the LA 580 is not constrained by an excess of periodic requests within the allowable time, the GMLC 590 continues with the positioning of the MS 500 (step 675). If the conditions are not satisfied (step 665) or if the PAI for that LA 580 entry has been deactivated (step 660), the positioning request 582 is rejected (step 630) and the GMLC 590 sends a rejection message to the requesting LA 580 indicating that the conditions for positioning have not been met (step 635).

Figure 6B:
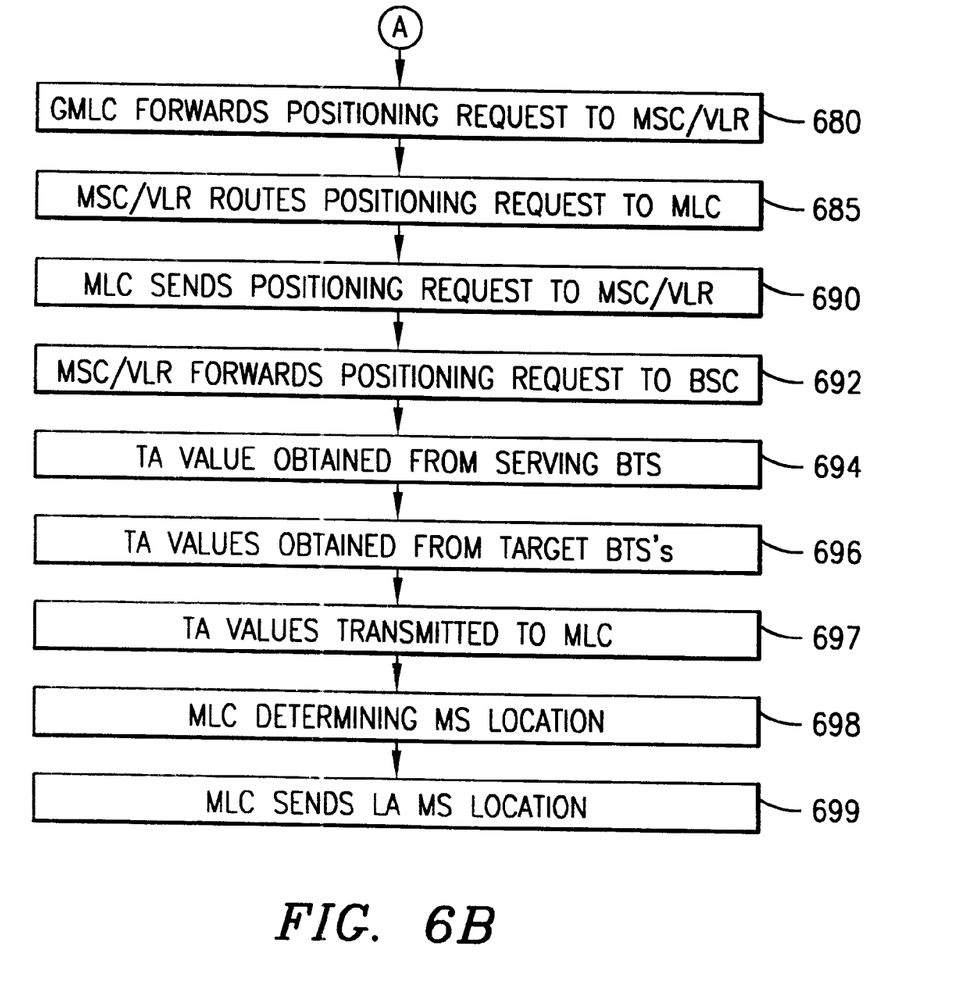

If, however, the LA 580 is not listed in the SLPP 555 or if the SLPP 555 contains no entries (step 655), the PAI for the entire SLPP 555 then has a generic behavior, which means that if the PAI is activated (step 670), then as shown in FIG. 6B of the drawings, any MSISDN or LA 580 can position the MS 500 (step 675). Otherwise, no MSISDN or LA 580 can position the MS 500 (steps 630 and 635) except for the LAs 580 with override capabilities, as stated hereinbefore.

Alternatively, the serving MSC/VLR 560 or serving MLC 570 can check the SLPP 555 of the MS 500. The SLPP 555 can be downloaded to the serving MSC/VLR 560 together the rest of the mobile subscriber's subscription information with the existing Mobile Application Part (MAP) operation INSERT_SUBSCRIBER_DATA or with the existing MAP operation RESTORE_DATA. The serving MSC/VLR 560 can then transfer the SLPP 555 to the serving MLC 570 if the serving MLC 570 normally performs the check. In addition, if the MSC/VLR 560 or MLC 570 normally performs the check, the POK 599 for privacy override indication is passed onto the MSC/VLR 560 or MLC 570 from the GMLC 590 along with the positioning request.

If the GMLC 590 determines that positioning can continue (step 675), the GMLC 590 can then send the positioning request to the serving MSC/VLR 560 (step 680), using the MSC/VLR 560 address. Thereafter, the serving MSC/VLR 560 can route the positioning request to the MLC 570 serving the PLMN 505 that the MS 500 is located in (step 685). It should be understood that the MLC 570 can be co-located with the serving MSC/VLR 560 or can be a separate node, the latter being illustrated.

Alternatively, after the GMLC 590 confirms that the MS 500 allows positioning to be performed (step 675), the GMLC 590 can derive, from the MSC/VLR 560 address, the address of the MLC 570 in the serving PLMN 505, using, for example, a look-up database (not shown). Thereafter, the positioning request 582 can be routed directly to the MLC 570 in the serving PLMN 505 (step 685).

It should be noted that if the serving MSC/VLR 560 and MLC 570 are located within a PLMN 505 different from the PLMN 585 that the GMLC 590 is located in, which is shown in FIG. 5, then, if the POK 599 is sent by the GMLC 590 with the value "override", the serving MLC 570 can either reject the positioning request 582 (step 630) and send a rejection message to the LA 580 (step 635), or convert the POK 599 to a value of "not override". If the POK 599 is converted to "not override," the serving MLC 570 must then check the SLPP 555 of the subscriber (step 655). If the subscriber's SLPP 555 allows positioning, positioning will continue (step 675). However, if the subscriber's SLPP 555 does not allow positioning, the serving MLC 570 can reject the positioning request 582 (step 630) and send a rejection message to the LA 580 (step 635). This avoids jurisdictional conflicts between PLMNs (505 and 585) with respect to the ability of LA's 580 to override privacy settings 555.

However, it should be understood that agreements between PLMN's (505 and 585) can state that POK 599 values of "override" will be accepted between the PLMN's (505 and 585). In addition, if the LA 580 is a law enforcement agency, which has a court order allowing positioning, then the POK 599 can be accepted by the serving MLC 570 if a court order also exists at the serving MLC 570. It should be understood that a POK 599 with the value "not override" will not be changed by the serving MLC 570 and positioning will then only occur if the subscriber's SLPP 555 allows it.

The positioning request can then be carried out by the MLC 570 sending the positioning request to the serving MSC/VLR 560 (step 690), which can then forward the positioning request to a Base Station Controller (BSC) 540 (step 692). If the MS 500 is in idle mode, the serving MSC/VLR 560 must page the MS 500 and setup a call to the MS 500 prior to forwarding the positioning request 582 to the BSC 540 (step 692). This call does not activate the ringing tone on the MS 500, and therefore, is not noticed by the MS 500.

The originating BSC 540 then determines which Base Transceiver Station (BTS) 520 is currently serving the MS 500, and obtains a Timing Advance (TA) value (TA1), or other positioning data, from this serving BTS 520 (step 694), if possible. Thereafter, TA values are obtained from at least two target BTSs (510 and 530) (step 696) by performing a positioning handover. If the serving BTS 520 does not support positioning, an additional target BTS (not shown) must be selected. It should be noted that other positioning methods can be used instead of obtaining TA values, as discussed herein. In addition, positioning of the MS 500 can be performed using more than three BTSs (510, 520, and 530).

The TA values (TA2 and TA3) measured by the target BTS's (510 and 530) are then transmitted by the serving BSC 540 to the MLC 570 via the MSC/VLR 560, together with the TA value TA1 obtained from the serving BTS 520 (step 697). The serving MLC 570 then determines the location of the MS 500 using the triangulation algorithm (step 698). The MLC 570 then presents the geographical position of the MS 500 to the requesting MSISDN or LA (node) 580 (step 699).

In alternative embodiments, the SLPP 555 can be defined and stored on a Subscriber Identity Module (SIM) card 502 within the MS 500 or within an external node, such as an Intelligent Network (IN) node 565, in order to off-load the information from the network. In this situation, either the GMLC 590, MLC 570 or serving MSC/VLR 560 can request the SLPP 555 from the MS 500 or the IN node when a positioning request 582 is received. Positioning can then continue as discussed above.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for allowing a mobile subscriber to selectively permit certain location applications to perform positioning of a mobile terminal associated with said mobile subscriber, each of said location applications having a separate identity associated therewith, said telecommunications system comprising:
    a node for responding to a positioning request for said mobile terminal, said positioning request being initiated by a requesting location application, said positioning request including said identity of said requesting location application; and
    a Subscriber Location Privacy Profile (SLPP) within said node, said SLPP being defined by said mobile subscriber and containing a list of location application identities allowed to position said mobile terminal, said SLPP enabling authorization of said positioning request when said identity of said requesting location application is within said list of location application identities.

2. The telecommunications system of claim 1, further comprising a gateway mobile location center for receiving said positioning request, said gateway mobile location center being in communication with said node.

3. The telecommunications system of claim 2, wherein said node is a home location register operatively connected with said gateway mobile location center, said home location register storing a subscriber profile for said mobile subscriber.

4. The telecommunications system of claim 3, wherein said SLPP is connected with said subscriber profile, said home location register sending said SLPP to said gateway mobile location center.

5. The telecommunications system of claim 4, further comprising a Mobile Switching Center/Visitor Location Register (MSC/VLR) in wireless communication with said mobile terminal and connected to said gateway mobile location center, said SLPP being sent from said home location register to said MSC/VLR, said gateway mobile location center forwarding said positioning request to said MSC/VLR, said MSC/VLR determining whether said identity of said requesting location application is within said list of location application identities.

6. The telecommunications system of claim 2, wherein said node is a memory within said mobile terminal, said SLPP being sent from said mobile terminal to said gateway mobile location center when said positioning request is received.

7. The telecommunications system of claim 2, wherein said node is an Intelligent Network node, said SLPP being sent from said mobile terminal to said gateway mobile location center when said positioning request is received.

8. The telecommunications system of claim 1, wherein said list of location identities comprises a list of Location Application Identifier Numbers.

9. The telecommunications system of claim 1, wherein said list of location application identities comprises a list of Mobile Station Integrated Service Digital Network numbers.

10. The telecommunications system of claim 1, wherein each said location application identity within said list of location application identities has conditions associated therewith, said SLPP enabling authorization of said positioning request when said conditions associated with said identity of said requesting location application have been satisfied.

11. The telecommunications system of claim 10, wherein said conditions comprise at least one of allowable times for said requesting location application to send said positioning request and restrictions on the number of previous positioning requests allowed to be sent by said requesting location application within said allowable times.

12. The telecommunications system of claim 1, wherein each said location application identity within said list of location application identities has a Positioning Allowed Indicator (PAI) associated therewith, said SLPP enabling authorization of said positioning request when said PAI associated with said identity of said requesting location application is active.

13. The telecommunications system of claim 1, wherein said SLPP has a Positioning Allowed Indicator (PAI) associated therewith, said SLPP enabling authorization of said positioning request when said PAI is active and said identity of said requesting location application is within said list of location application identities.

14. The telecommunications system of claim 1, wherein said requesting location application has a privacy override key associated therewith, said SLPP enabling authorization of said positioning request when said identity of said requesting location application is within said list of location application identities and when said privacy override key is set to "not override."

15. The telecommunications system of claim 1, wherein said mobile subscriber can define, activate, deactivate or delete said SLPP using said mobile terminal.

16. The telecommunications system of claim 1, wherein said mobile subscriber can remove one or more identities of one or more respective ones of said location applications from said list of location application identities to prevent said respective location applications from positioning said mobile terminal without affecting the ability of remaining ones of said location applications remaining within said list of location application identities to position said mobile terminal.

17. A method for allowing a mobile subscriber to selectively permit certain location applications to perform positioning of a mobile terminal associated with said mobile subscriber, each of said location applications having a separate identity associated therewith, said method comprising the steps of:
defining, by said mobile subscriber, a Subscriber Location Privacy Profile (SLPP), said SLPP containing a list of location application identities allowed to position said mobile terminal;
receiving a positioning request for said mobile terminal from a requesting location application, said positioning request including said identity of said requesting location application; and
enabling authorization of said positioning request, by said SLPP, when said identity of said requesting location application is within said list of location application identities.

18. The method of claim 17, wherein said SLPP is stored within a home location register connected to a gateway mobile location center, said gateway mobile location center receiving said positioning request, said home location register storing a subscriber profile connected with said SLPP, and further comprising the step of:
sending said SLPP from said home location register to said gateway mobile location center.

19. The method of claim 17, wherein said step of enabling further includes the step of determining whether conditions associated with said identity of said requesting location application stored within said list of location application identities have been satisfied.

20. The method of claim 19, wherein said step of determining further comprises the step of determining at least one of allowable times for said requesting location application to send said positioning request and restrictions on the number of previous positioning requests allowed to be sent by said requesting location application within said allowable times.

21. The method of claim 17, wherein each said location application identity within said list of location application identities has a Positioning Allowed Indicator (PAI) associated therewith, said step of enabling further comprising the step of enabling authorization of said positioning request when said PAI associated with said requesting location application is active.

22. The method of claim 17, wherein said SLPP has a Positioning Allowed Indicator (PAI) associated therewith, said step of enabling further comprising the step of enabling authorization of said positioning request when said PAI is active and said identity of said requesting location application is within said list of location application identities.

23. The method of claim 17, further comprising the steps of:
sending said SLPP to said MSC/VLR;
forwarding said positioning request from said gateway mobile location center to a Mobile Switching Center/Visitor Location Register (MSC/VLR) in wireless communication with said mobile terminal; and
determining, by said MSC/VLR, whether said identity of said requesting location application is within said list of location application identities.

24. The method of claim 17, wherein said requesting location application has a privacy override key associated therewith, said step of enabling further comprising the step of enabling authorization of said positioning request when said identity of said requesting location application is within said list of location application identities and said privacy override key is set to "not override."

25. The method of claim 17, further comprising the step of:
removing one or more identities of one or more respective ones of said location applications from said list of location application identities to prevent said respective location applications from positioning said mobile terminal without affecting the ability of remaining ones of said location applications remaining within said list of location application identities to position said mobile terminal.

26. A telecommunications system for allowing a mobile subscriber to selectively permit certain location applications to perform positioning of a mobile terminal associated with said mobile subscriber, each of said location applications having a separate identity associated therewith, said telecommunications system comprising:
means for defining, by said mobile subscriber, a Subscriber Location Privacy Profile (SLPP), said SLPP containing a list of location application identities allowed to position said mobile terminal;
means for receiving a positioning request for said mobile terminal from a requesting location application, said positioning request including said identity of said requesting location application; and
means for enabling authorization of said positioning request, by said SLPP, when said identity of said requesting location application is within said list of location application identities.

* * * * *

UNITED STATES PATENT AND TRADEMARK OFFICE
CERTIFICATE OF CORRECTION

PATENT NO. : 6,360,102 B1
DATED : March 19, 2002
INVENTOR(S) : Theodore Havinis et al.

It is certified that error appears in the above-identified patent and that said Letters Patent is hereby corrected as shown below:

Column 7,
Line 51, replace "network is operator" with -- network operator --

Signed and Sealed this

Eighteenth Day of June, 2002

Attest:

JAMES E. ROGAN
Attesting Officer  Director of the United States Patent and Trademark Office